United States Patent
Oh et al.

(10) Patent No.: US 8,199,393 B2
(45) Date of Patent: Jun. 12, 2012

(54) SCANNER MOTOR

(75) Inventors: Song Bon Oh, Gyunggi-do (KR); Young Jin Bae, Gyunggi-do (KR); Sang Jae Song, Gyunggi-do (KR)

(73) Assignee: Yong Nam Eom, Suwon-Si, Gyeonggi-Do (KR)

( * ) Notice: Subject to any disclaimer, the term of this patent is extended or adjusted under 35 U.S.C. 154(b) by 426 days.

(21) Appl. No.: 12/581,130

(22) Filed: Oct. 17, 2009

(65) Prior Publication Data
US 2011/0019253 A1    Jan. 27, 2011

(30) Foreign Application Priority Data
Jul. 23, 2009  (KR) .................. 10-2009-0067333

(51) Int. Cl.
*G02B 26/08*    (2006.01)
(52) U.S. Cl. ................ 359/216.1; 359/200.1; 359/200.7
(58) Field of Classification Search .... 359/200.1–200.5, 359/200.7, 216.1–219.2, 850, 855
See application file for complete search history.

(56) References Cited

U.S. PATENT DOCUMENTS
6,151,151 A * 11/2000 Ozaki .................. 359/200.1

FOREIGN PATENT DOCUMENTS
KR    10-2003-0084148 A    11/2003
* cited by examiner

*Primary Examiner* — James Phan
(74) *Attorney, Agent, or Firm* — Blakely Sokoloff Taylor & Zafman LLP

(57) ABSTRACT

Disclosed herein is a scanner motor. The motor includes a base plate supporting the scanner motor, with a circuit board mounted on the base plate. A rotating shaft supports the scanner motor vertically in such a way that the scanner motor is rotatable. A bearing is rotatably fitted over the rotating shaft. A bearing holder holds the bearing. A stator is mounted to an outer circumference of the bearing holder to generate electricity. A rotor case is rotatably fitted over the rotating shaft so as to mount a polygon mirror. Three semicircular protrusions protrude from an upper portion of the rotor case at regular intervals to stably support the polygon minor. A concave part is formed between the protrusions to absorb external stress.

5 Claims, 5 Drawing Sheets

SCANNER MOTOR

CROSS REFERENCE TO RELATED APPLICATION(S)

This application claims the benefit of Korean Patent Application No. 10-2009-0067333, filed on Jul. 23, 2009, entitled "SCANNER MOTOR", which is hereby incorporated by reference in its entirety into this application.

BACKGROUND OF THE INVENTION

1. Technical Field

The present invention relates generally to a scanner motor and, more particularly, to a scanner motor which is used in an output device using optical technology, such as a laser beam printer or a scanner, so as to rotate a polygon mirror.

2. Description of the Related Art

As the market for output devices using optical technology requires miniaturization and high speed, higher performance must be provided to an actuator for driving an optical reflecting device, the important part of which is a polygon mirror.

The most important performance factor which is required recently is the flatness of the optical reflecting unit such as the polygon mirror and the rotating center of a rotating shaft when it is in operation. Further, the reduction in manufacturing cost as well as performance is important matters to be considered.

The scanner motor is the machine which is installed in a laser beam printer or the like and rotates a polygon mirror at high speed to deflect and scan optical beams emitted from a light source. In the scanner motor, the polygon mirror rotating at high speed must be mounted and secured to the scanner motor. A conventional scanner motor is schematically shown in FIG. 7.

As shown in FIG. 7, the conventional scanner motor 10 includes a polygon mirror 11 which is provided on the upper portion of the scanner motor 10, and a spring 12 which is used to couple the polygon minor 11 to the housing shaft 13. Such a conventional scanner motor is disclosed in Korean Patent Laid-Open Publication No. 2003-84148.

The scanner motor 10 rotates a housing shaft 13 with force between a stator (not shown) which is mounted to the outer circumference of a bearing holder (not shown) and is thus subjected to external power, and a rotor magnet 15 which is mounted to the inner circumference of the rotor case 14.

The housing shaft 13 mounts the polygon minor 11, and the rotor case 14 is mounted to the lower portion of the housing shaft 13.

The housing shaft 13 has a disc shape, with the polygon mirror 11 mounted to the housing shaft 13. A rotating shaft 16 is inserted into the central portion of the housing shaft 13 to be secured thereto. The spring 12 is pressed against the upper surface of the housing shaft 13, thus locking the upper portion of the polygon mirror 11.

The rotor case 14 is secured to the lower surface of the housing shaft 13 using caulking, and the rotor magnet 15 is mounted to the inner circumferential wall of the rotor case 14 in such a way as to face the stator (not shown).

The polygon mirror 11 is mounted to the housing shaft 13 of the scanner motor 10 in such a way as to be rotated, and reflects laser beams in a laser beam printer or the like. Here, at least part of the upper surface of the polygon minor 11 is pressed by the spring 12 installed to the housing shaft 13 to be secured to the housing shaft 13.

However, the scanner motor 10 constructed as described above is problematic in that the housing shaft 13, serving as the support part of the polygon minor 11 and manufactured through machining, is used to secure the flatness of the rotating shaft 16 and the polygon minor 11, and coupling force between the spring 12 and the polygon mirror 11 is low, so that the spring 12 and the polygon mirror 11 is separable from the scanner motor 10 in case there is a strong impact transmitted from the exterior.

Further, the spring 12 may be deformed by floating force of the polygon mirror 11 when the scanner motor 10 rotates at high speed. Thereby, the overall balance of the scanner motor 10 is impaired, so that it is impossible to obtain the stable driving characteristics of the scanner motor 10.

Therefore, there is an urgent need for research into a scanner motor, which is capable of preventing the dislocation of the polygon mirror 11, and of firmly retaining the polygon mirror 11, thus keeping the balance of the polygon mirror 11 stable, and reducing the manufacturing cost of parts.

SUMMARY OF THE INVENTION

The present invention has been made in an effort to provide a scanner motor, which stably supports a polygon mirror, absorbs internal stress to minimize the strain of a rotary part, and enables high strength coupling, in addition to reducing manufacturing cost.

In a scanner motor according to an embodiment of the present invention, a base plate supports a whole portion of the scanner motor, with a circuit board being mounted on an upper surface of the base plate and a bearing holder being secured to a central portion of the base plate. A rotating shaft supports the scanner motor vertically in such a way that the scanner motor is rotatable. A bearing is rotatably fitted over an outer circumference of the rotating shaft. The bearing holder holds the bearing. A stator is mounted to an outer circumference of the bearing holder to generate electricity. A rotor case is rotatably fitted over and secured to an outer circumference of the rotating shaft so as to mount a polygon mirror thereon. Three semicircular protrusions protrude from an upper portion of the rotor case at regular intervals to stably support the polygon mirror. A concave part is formed between the protrusions to absorb external stress.

The rotor case may be manufactured through pressing using a magnetic material such as iron, the upper portion, side portion, and lower portion of the rotor case being integrated into the cup-shaped rotor case.

The concave part may have the shape of a circle, a fan or a rod.

The rotor case may further include an annular step inside a circle defined by the protrusions in such a way as to be positioned under the protrusions.

Further, the rotating shaft may be fused and joined to the rotor case using a welder, thus providing a coupled part for preventing a removal of the rotor case.

The above and other objects, features and advantages of the present invention will be more clearly understood from the following detailed description taken in conjunction with the accompanying drawings.

The terminology or words used in the description and the claims of the present invention should not be interpreted as being limited merely to common or dictionary meanings. On the contrary, they should be interpreted based on the meanings and concepts of the invention in keeping with the scope of the invention on the basis of the principle that the inventor(s) can appropriately define the terms in order to best describe the invention.

DESCRIPTION OF THE PREFERRED EMBODIMENTS

Figure 1:
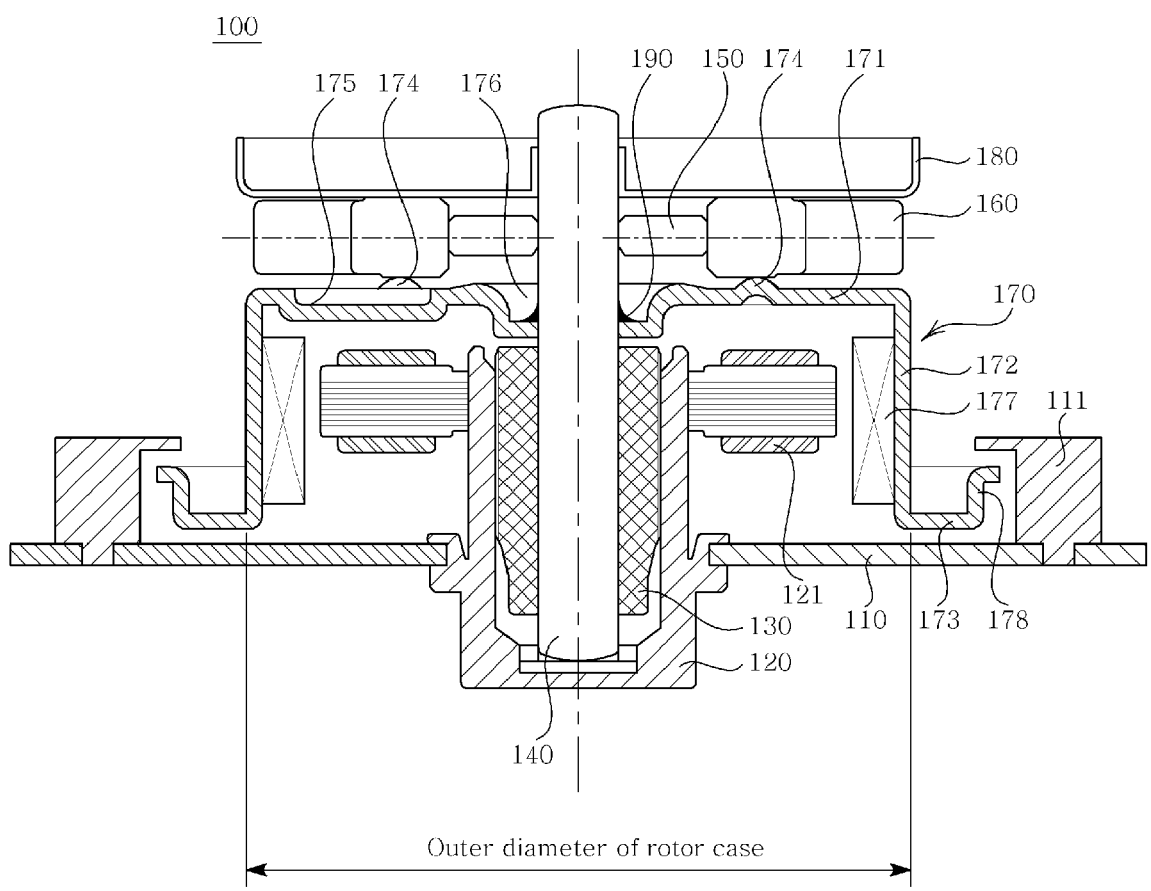
FIG. 1 is a sectional view illustrating a scanner motor according to the present invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted herein.

Hereinafter, a scanner motor according to the preferred embodiment of the present invention will be described in detail with reference to the accompanying drawings.

As shown in FIGS. 1 to 4, the scanner motor 100 of the present invention includes a stationary unit and a rotary unit which is rotatably supported by the stationary unit.

The stationary unit has a base plate 110, a bearing holder 120, a bearing 130 and a stator 121.

The base plate 110 functions to support the whole portion of the scanner motor 100. A circuit board (not shown) is mounted on the upper surface of the base plate 110 to electrically control the stator 121, and the bearing holder 120 is secured to the central portion of the base plate 110 in such a way as to be stepped from the upper and lower surfaces of the base plate 110.

The bearing holder 120 accommodates the bearing 130 therein to support it, and has a hollow cylindrical shape. The bearing holder 120 is fixedly coupled to the base plate 110, with the stator 121 provided on the outer circumference of the bearing holder 120.

The bearing 130 functions to rotatably support a rotating shaft 140 inserted into the inner circumference of the bearing 130, and has a hollow cylindrical shape. The outer circumference of the bearing 130 is in close contact with the inner circumference of the bearing holder 120.

Further, a lubricant is contained between the bearing 130 and the rotating shaft 140 to smoothly rotate the rotating shaft 140.

The stator 121 is subjected to external power to form an electric field, and includes a core and a coil wound around the core.

The core is fixedly mounted to the outer circumference of the bearing holder 120. In order to achieve the thinness of the scanner motor 100, the core is preferably installed to be adjacent to the base plate 110.

The coil is placed to face a rotor magnet 177 of a rotor case 170 and forms an electric field using external power, thus rotating the rotor case 170 using magnetic force between the coil 121 and the rotor magnet 177.

Meanwhile, the rotary unit has the rotating shaft 140, a polygon mirror 160, the rotor case 170 and a locking part 180.

The rotating shaft 140 functions to axially support the entire rotary unit, and is inserted into the inner circumference of the bearing 130 in such a way as to be rotatably supported by the bearing 130.

The polygon mirror 160 functions to deflect and scan optical beams emitted from a light source (not shown), and is mounted to the upper portion 171 of the rotor case 170. A polygon mirror guide 150 is provided between the rotating shaft 140 and the polygon minor 160 to determine the installing position of the polygon minor 160.

The rotor case 170 is fitted over the outer circumference of the rotating shaft 140 to be secured thereto. The polygon mirror 160 is seated on the upper portion of the rotor case 170 and the annular rotor magnet 177 is attached to the inner surface of the rotor case 170 in such a way as to face the stator 121.

The rotor case 170 is a cup-shaped part which is manufactured through pressing using a magnetic material such as iron. Thus, the scanner motor of this invention does not use a conventional housing shaft manufactured through machining, thus reducing manufacturing cost in comparison with the scanner motor using the housing shaft.

The rotor case 170 is manufactured such that the upper portion 171, the side portion 172, and the lower portion 173 of the rotor case 170 are integrated with each other.

A semicircular protrusion 174 is provided at a predetermined position on the upper portion 171 of the rotor case 170 in such a way as to protrude towards the polygon minor 160. The polygon mirror 160 is seated on the protrusion 174.

Three or more protrusions 174 are formed at regular intervals so as to stably support the polygon mirror 160.

Further, concave parts 175 are formed between the protrusions 174 in a direction opposite to the protruding direction of the protrusions 174, thus absorbing external stress.

The construction and shape of the protrusions 174 and the concave parts 175 will be described below in detail with reference to FIGS. 2 and 3.

The side portion 172 of the rotor case 170 is a support part which extends downwards from the upper end of the upper portion 171 of the rotor case supporting the polygon mirror 160. Preferably, each of the upper and side portions 171 and 172 of the rotor case has a thickness which is sufficient to prevent the upper or side portion 171 or 172 from being bent or deformed by floating force acting on the polygon minor 160 when the scanner motor 100 rotates at high speed.

The lower portion 173 of the rotor case 170 extends horizontally from the lower end of the side portion 172 of the rotor case 170. An engagement part 178 is provided on an end of the lower portion 173 of the rotor case 170 to engage with a stopper 111 which is installed to prevent the rotor case 170 from separating from the rotating shaft 140.

The locking part 180 functions to lock the polygon minor 160 to the upper portion 171 of the rotor case. The locking part 180 presses the polygon mirror 160 against the upper portion 171 of the rotor case, thus preventing the separation of the polygon mirror 160 during rotation. The locking part 180 comprises an elastic member, generally, a spring.

Figure 2:
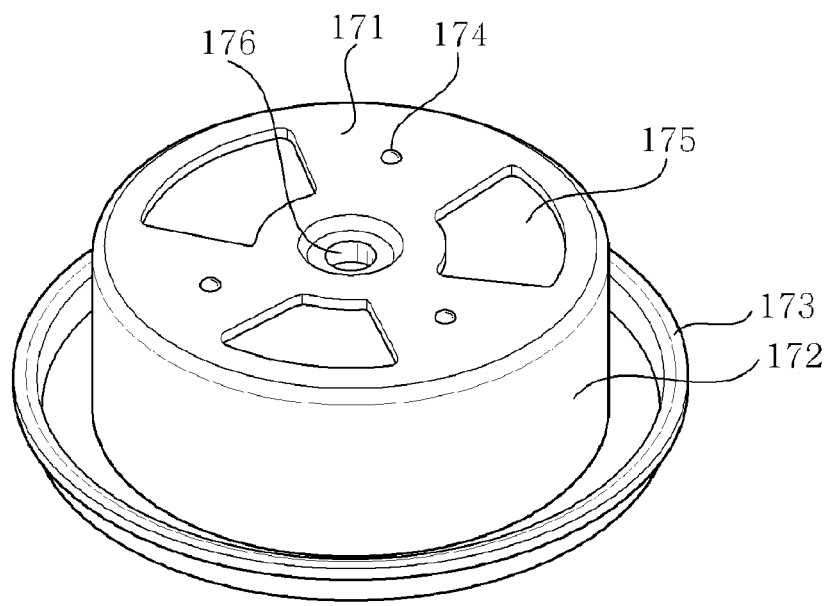
FIG. 2 is an enlarged view illustrating a rotor case of the scanner motor according to the present invention.
Figure 3:
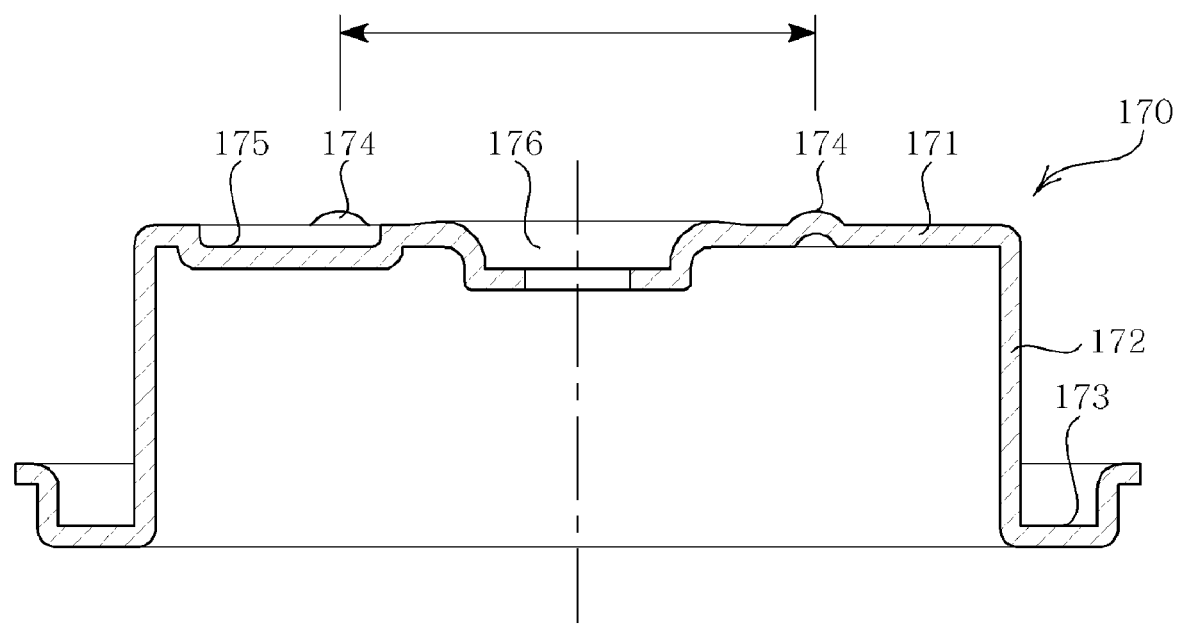
FIG. 3 is a side enlarged view illustrating the scanner motor according to the present invention.

As shown in FIGS. 2 and 3, the rotor case 170 is a cup-shaped part which is manufactured through pressing using a magnetic material such as iron. The semicircular protrusions 174 are formed on the upper portion 171 of the rotor case at regular intervals along the circumference of the rotor case so as to allow the polygon mirror 160 to be stably seated on the upper portion 171 of the rotor case.

Each protrusion 174 is formed on the upper portion 171 of the rotor case to protrude towards the polygon minor 160 in a semicircular shape. At least three protrusions are formed at regular intervals in a radial direction of the rotor case.

It is preferable that three protrusions 174 be arranged at intervals of 120° so as to guarantee maximum flatness with a minimum number.

According to this embodiment, three protrusions 174 are formed. However, the number of protrusions 174 is not limited to three and may be changed so as to adjust the coupling force of the polygon mirror 160.

The protrusions 174 prevent the polygon mirror 160 from being tilted on the upper portion of the rotor case 170 because of the load of the locking part 180 which locks the polygon minor 160, in addition to keeping the polygon minor 160 flat even when rotating.

The protrusions 174 are formed on the upper portion of the rotor case 170, and in addition, the concave parts 175 are provided between the protrusions 174 in a direction opposite to the protruding direction of the protrusions 174.

Three or more concave parts 175 are formed at regular intervals. Each concave part 175 is not limited to a specific shape, and preferably has the shape of a circle, fan or rod.

Because of centrifugal force produced when the rotor case 170 rotates, stress is to added to the outer circumference of the rotor magnet 177, so that the rotor case 170 is deformed outwards. However, according to this invention, the concave parts 175 absorb the stress and prevent the protrusions 174 from deforming, therefore allowing the polygon minor 160 to stably rotate while maintaining flatness.

A step 176 is formed to prevent the protrusions 174 from being deformed by stress applied to a welded part when the rotor case 170 is laser welded to the rotating shaft 140. The step having an annular shape is formed inside a circle defined by the protrusions 174 in such a way as to be positioned under the protrusions 174.

The step 176 is formed such that a coupled part 190 of the rotating shaft 140 with the rotor case 170 is positioned to be lower than the protrusions 174.

Figure 4:
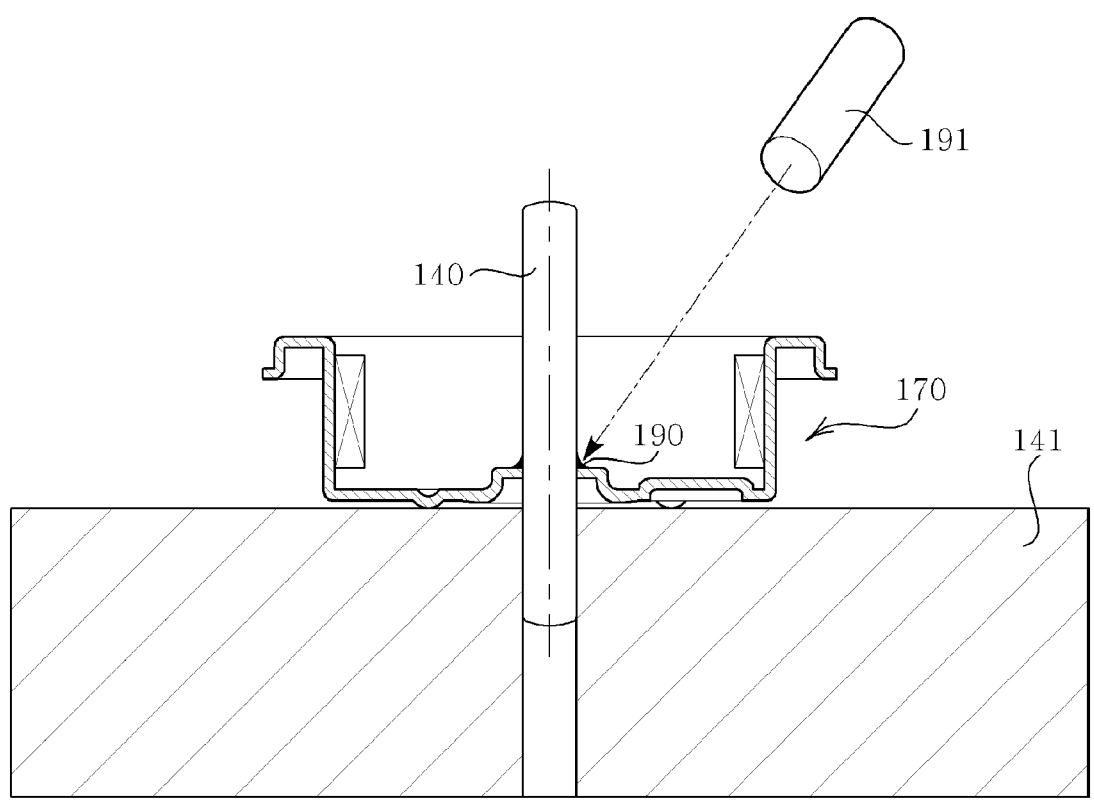
FIG. 4 is a side view illustrating the scanner motor and a jig according to the present invention.

As shown in FIG. 4, the rotor case 170 is turned upside down and inserted into a central hole of a jig 141 which has on its upper portion a right-angled plane, so that the protrusions 174 and the rotating shaft 140 are perpendicular to each other.

The upper portion of the rotor case 170 and the rotating shaft 140 are fused and joined to each other using a welder 191, thus preventing the dislocation of the rotor case 170, or are adhered to each other using an adhesive, thus forming the coupled part 190.

The welder 191 may use a laser welder which is advantageous in terms of high strength coupling.

The coupled part 190 allows the rotor case 170 to be stably rotated without being removed from the rotating shaft 140.

As such, the scanner motor 100 according to the present invention is provided with the rotor case 170 including the protrusions 174 which are formed on the upper portion 171 of the rotor case at regular intervals, the concave parts 175 which are formed between the protrusions 174 in a direction opposite to the protruding direction of the protrusions 174, and the step 176 which is formed inside the circle defined by the protrusions 174 in such a way as to be positioned under the protrusions 174, thus stably supporting the to polygon minor 160 and keeping the polygon mirror 160 flat even when it is rotated.

Further, the concave parts 175 absorb stress generated when a welding process for high strength coupling using a laser welder or the like is performed, thus reducing the deformation of the rotor case 170 and the displacement amount of the three protrusions 174.

Figure 5:
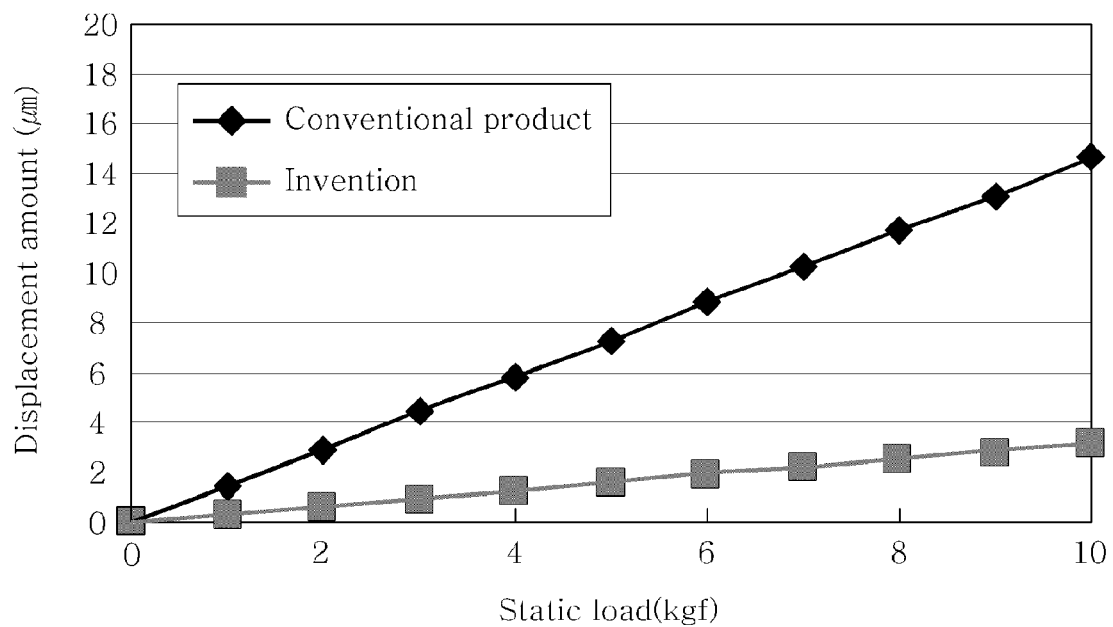
FIG. 5 is a graph illustrating the displacement amount of three protrusions as a function of static load in the scanner motor according to the present invention.

FIG. 5 is a graph illustrating the displacement amount of three protrusions 174 as a function of static load, when the diameter of a circle defined by the three protrusions 174 is ϕ 18 to 20.

The polygon minor 160 is locked by the locking part 180 applying static load vertically in an axial direction. The static load of the locking part 180 causes the deformation of the polygon minor 160 and the rotary part. Thus, according to this invention, in order to prevent the characteristics of the rotary part from being changed, the polygon mirror 160 is locked by the locking part 180 which applies a static load of 2 kgf or more.

The larger the static load of the locking part 180 is, the more efficiently can the movement of the polygon minor 160 be prevented. However, the large static load increases the load acting on the rotor case 170, so that there is strong possibility that the rotor case 170 and the protrusions 174 supporting the polygon minor 160 become deformed downwards.

As such, as the displacement amount of the rotor case 170 and the protrusions 174 increases, the deformation of the polygon mirror 170 also increases. Consequently, the overall driving characteristics of the scanner motor 100 become changed.

Therefore, according to the present invention, the concave parts 175 are formed between the protrusions 174, thus remarkably reducing the displacement amount of the protrusions 174, as shown in the graph of FIG. 5.

Figure 6:
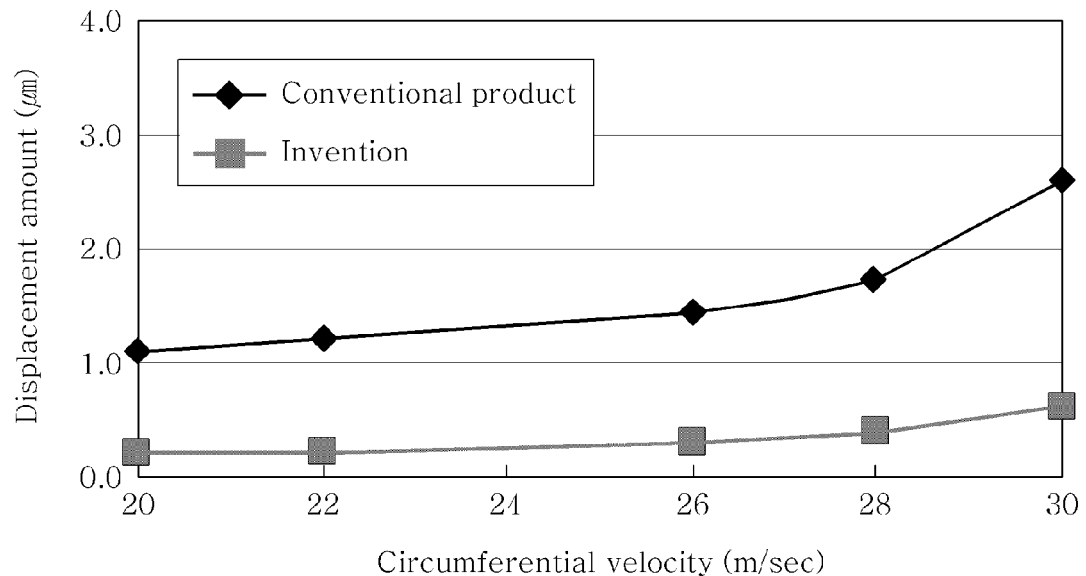
FIG. 6 is a graph illustrating the displacement amount of the three protrusions as a function of circumferential velocity of an outer diameter of the rotor case in the scanner motor according to the present invention.
Figure 7:
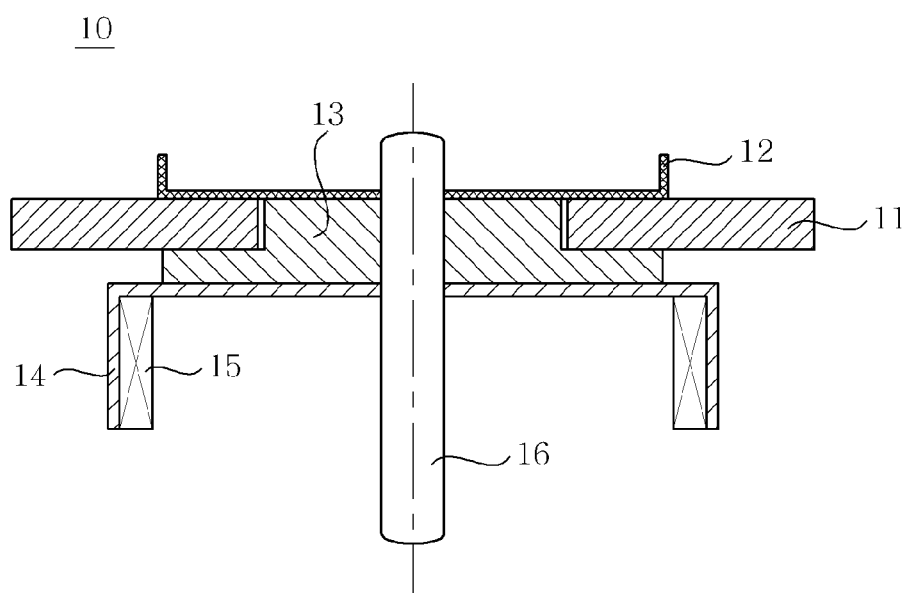
FIG. 7 is a sectional view illustrating a conventional scanner motor.

Meanwhile, the effect of the centrifugal force generated by rotation needs to be considered. FIG. 6 is a graph illustrating the displacement amount of the three protrusions 174 as a function of circumferential velocity of the outer diameter of the rotor case 170, when the rotor case 170 has the outer diameter of ϕ 25 and a diameter of the circle defined by the three protrusions 174 is ϕ 18 to 20.

The centrifugal force is changed depending on the outer diameter of the rotor case 170. But, the small polygon mirror which is widely used has the outer diameter of ϕ 20. In this case, the outer diameter of the rotor case 170 is about ϕ 25.

As shown in FIG. 6, in the conventional scanner motor, the displacement amount of the three protrusions 174 starts to increase from when the circumferential velocity of the outer diameter of the rotor case 170 is 20 m/sec or more, and the displacement amount of the three protrusions 174 exceeds 2 μm when the circumferential velocity is 30 m/sec or more. In this case, the polygon minor 160 which is precisely machined becomes deformed, so that the important characteristics of the motor are negatively impacted.

Conversely, according to the present invention, the concave parts 175 are formed between the protrusions 174, so that the displacement amount of the protrusions 174 is remarkably reduced, as shown in the graph.

As shown in FIGS. 5 and 6, it can be seen that the rotor case 170, including the protrusions 174 which are formed on the upper portion 171 of the rotor case at regular intervals, the concave parts 175 which are formed between the protrusions 174 in a direction opposite to the protruding direction of the protrusions 174, and the step 176 provided inside the circle defined by the protrusions 174 in such a way as to be positioned under the protrusions, considerably reduces the displacement amount of the three protrusions 174 in accordance with the static load and the circumferential velocity of the rotor case, in comparison with a conventional rotor case.

As described above, the present invention provides a scanner motor, which is provided with a rotor case including protrusions formed on an upper portion of the rotor case at regular intervals, concave parts formed in a direction opposite to the protruding direction of the protrusions, and an annular step provided inside a circle defined by the protrusions in such a way as to be positioned under the protrusions, thus stably supporting a polygon minor and maintaining flatness during rotation.

Further, concave parts absorb stress generated when a welding process for high strength coupling is performed using a laser welder or the like, thus reducing a change in a rotor case due to compressive load and centrifugal force, in addition to reducing the displacement amount of three protrusions in accordance with static load and circumferential velocity.

Further, a rotor case made of a magnetic material such as iron can be fastened and machined within a short period of time, and a housing shaft manufactured through machining is not required, so that manufacturing cost can be reduced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A scanner motor, comprising:
    a base plate supporting a whole portion of the scanner motor, with a circuit board being mounted on an upper surface of the base plate and a bearing holder being secured to a central portion of the base plate;
    a rotating shaft supporting the scanner motor vertically in such a way that the scanner motor is rotatable;
    a bearing rotatably fitted over an outer circumference of the rotating shaft;
    to the bearing holder for holding the bearing;
    a stator mounted to an outer circumference of the bearing holder to generate electricity;
    a rotor case rotatably fitted over and secured to an outer circumference of the rotating shaft so as to mount a polygon minor thereon;
    three protrusions protruding from an upper portion of the rotor case at regular intervals to stably support the polygon minor; and
    a concave part formed between the protrusions to absorb external stress.

2. The scanner motor as set forth in claim 1, wherein the rotor case is manufactured through pressing using a magnetic material such as iron, the upper portion, side portion, and lower portion of the rotor case being integrated into the cup-shaped rotor case.

3. The scanner motor as set forth in claim 1, wherein the concave part has the shape of a circle, a fan or a rod.

4. The scanner motor as set forth in claim 1, wherein the rotor case further comprises an annular step inside a circle defined by the protrusions in such a way as to be positioned under the protrusions.

5. The scanner motor as set forth in claim 1, wherein the rotating shaft is fused and joined to the rotor case using a welder, thus providing a coupled part for preventing a removal of the rotor case.

* * * * *